United States Patent

[11] 3,586,879

[72] Inventor Donald L. Ford
226 N. Rural St., Indianapolis, Ind. 46201
[21] Appl. No. 766,478
[22] Filed Oct. 10, 1968
[45] Patented June 22, 1971

[54] DISCRIMINATOR CIRCUIT
5 Claims, 1 Drawing Fig.

[52] U.S. Cl. .......... 307/235, 307/318
[51] Int. Cl. .......... H03k 5/20
[50] Field of Search .......... 307/235, 318

[56] References Cited
UNITED STATES PATENTS 3,041,469 6/1962 Ross .......... 307/235
3,099,000 7/1963 Dunning .......... 307/235 X
3,139,562 6/1964 Freeborn .......... 307/318 X
3,487,233 12/1969 Reap .......... 307/235

*Primary Examiner*—John S. Heyman
*Assistant Examiner*—John Zazworksy
*Attorney*—Woodard, Weikart, Emhardt & Naughton ABSTRACT: Two normally nonconducting transistors are connected across an input, both being held nonconducting by Zener diodes in their base circuits. Values of Zener voltages prevent an output from one transistor until a minimum input voltage level is reached, and after a selected maximum input voltage level is reached, whereby a circuit output is available for a range of input voltages within selected limits.

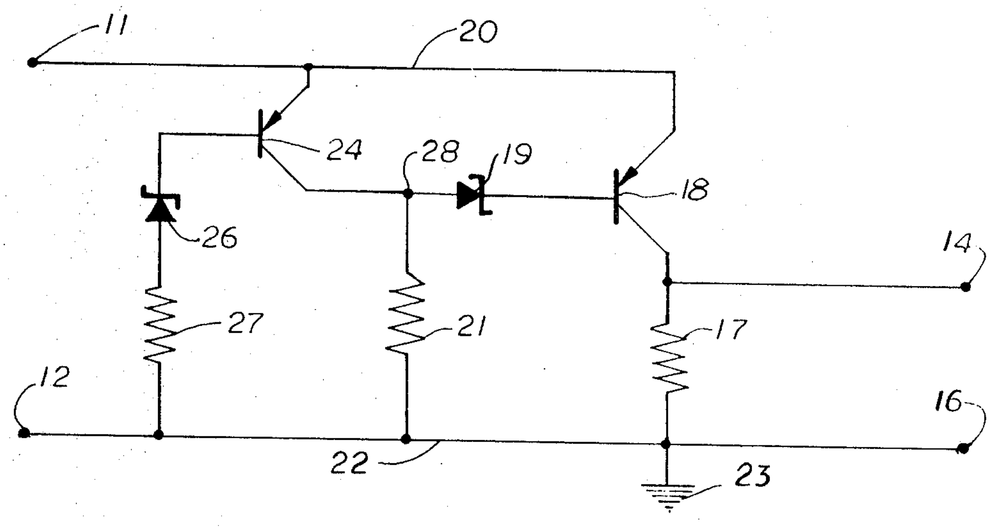
INVENTOR
DONALD L. FORD
BY
Woodard, Weikart, Emhardt & Naughton
ATTORNEYS

DISCRIMINATOR CIRCUIT

BACKGROUND OF THE INVENTION

1. Field of the Invention

This invention relates generally to electronic circuits, and more particularly to those of the detector or discriminator type.

2. Description of the Prior Art

A variety of circuits is known for detector and discriminator functions, as well as for voltage and current regulation functions. Some examples of miscellaneous circuits dealing with voltage controls are found in the following U.S. Pat. Nos.: 2,534,207 Picking et al. Dec. 12, 1950; 2,776,382 Jensen Jan. 1, 1957; 2,809,301 Short Oct. 8, 1957: 3,099,782 Smith, Jr. July 30, 1963

There has remained a need for simple and versatile circuitry responsive to input voltages within certain desired limits, and capable of various uses. For example it is desirable to provide a circuit which can serve as a voltage discriminator, and yet requires no capacitors or inductors. It is also desirable to provide a circuit capable of serving as a frequency multiplier, without being limited to the usual full-wave rectifiers and bridge rectifiers and multivibrators. It is also desirable to provide a circuit capable of use as a frequency doubler and using a single ground reference for the input and output signals. The present invention provides the answer to these needs.

SUMMARY OF THE INVENTION

Described briefly, in a typical embodiment of the present invention, a first transistor is provided with a load circuit path in series with an impedance, the combination being connected across voltage input terminals, and output terminals being provided across the impedance. This transistor is normally held nonconducting by a Zener diode in the base circuit thereof. A second transistor with a Zener diode in its base circuit is also held nonconducting, and the load circuit thereof is connected to the base circuit of the first transistor. The first Zener diode is selected for a minimum voltage input requirement to turn on the first transistor and provide an output. The second Zener diode is selected for a minimum input voltage requirement to turn on the second transistor for turning off the first transistor at a second input voltage level higher than the first.

BRIEF DESCRIPTION OF THE DRAWING

The full nature of the invention will be understood from the accompanying drawings and the following description and claims.

The single FIGURE of drawing illustrates schematically a typical embodiment of the present invention.

DESCRIPTION OF THE PREFERRED EMBODIMENT

Referring now to the drawing in detail, terminals 11 and 12 are provided for an input voltage and terminals 14 and 16 are provided for the circuit output. The input voltage is applied across the series combination of a first resistor 17 and the emitter-collector path of a first PNP transistor 18. The base electrode of transistor 18 is connected through a Zener diode 19 and the resistor 21 to the input terminal 12 through the input conductor 22. Conductor 22 serves as a common ground for the input and output terminals as designated by the ground symbol 23.

A second transistor 24 is provided with its emitter-collector path in series with the resistance 21, this series combination being connected across the input conductors 20 and 22. The base electrode of transistor 24 is connected through Zener diode 26 and resistor 27 to the ground conductor 22.

The Zener diode 19 is oriented to normally prevent forward biasing current in the base circuit of transistor 18, and Zener diode 26 is oriented to normally prevent forward biasing current in the emitter-base path of transistor 24. The values of the Zener diodes and resistors 21 and 27 are selected for the desired type of operation of the circuit which will now be described.

In operation, both transistors 18 and 24 are normally nonconducting. It is desired that conduction occur, with the resultant output at terminals 14 and 16, only if the input voltage reaches a certain minimum level such as 10 volts, for example. For this purpose, the Zener diode 19 is selected so that its Zener voltage is high enough to prevent any input voltage up to 10 volts from forward biasing the emitter-base junction of transistor 18 sufficiently to cause it to conduct. However, as soon as the input voltage reaches the minimum desired level of 10 volts, the reverse conduction in diode 19 occurs and the transistor 18 switches into saturation by reason of the flow of base-emitter current, thus producing approximately a 10-volt output across terminals 14 and 16.

The Zener voltage of Zener diode 26 is selected to keep transistor 24 from conducting until the input voltage across terminals 11 and 12 exceeds a certain minimum, higher than the voltage causing breakdown of Zener diode 19. For example, if it is desired to terminate the output across terminals 14 and 16 in the event the input voltage exceeds 12 volts, the Zener diode 26 will be selected to have a Zener voltage permitting conduction of transistor 24 when the input voltage reaches 12 volts.

Upon conduction of transistor 24, the voltage at junction 28 rises virtually to that at the input terminal 11 whereupon the voltage drop across Zener diode 19 falls below its reverse breakdown voltage. This causes the current through the base-emitter junction of transistor 18 to cease whereupon conduction of the transistor terminates. Accordingly the voltage at terminal 14 drops to ground, and there is no longer an output. So it is seen that an output is provided across terminals 14 and 16 for input voltages between 10 and 12 volts. Other limits can be established by appropriate selection of components.

From the foregoing description, it should be understood that upon return of input voltage from a level higher than 12 volts in the preceding example, conduction of transistor 24 will terminate when input voltage falls below 12 volts. Reverse current flow in Zener diode 19 will be reestablished during passage of input voltage from 12 to 10 volts, to turn on transistor 18. Accordingly there will again be an output across terminals 14 and 16 during the decrease of input voltage from 12 to 10 volts. Then reverse current flow in Zener diode 19 will terminate and the transistor 18 will shut off. It will be recognized that this feature can be used in a frequency doubling manner, because during the rise and fall of one-half of a sine wave, for example, the output of the present circuit can rise and fall twice.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention I claim is:

1. A discriminator comprising:

first and second input conductors;

a first transistor having a load circuit path and a control circuit path therein, said control circuit path being in a first series circuit combination with a first Zener diode and first impedance means, said first combination being connected across said input conductors;

a second transistor having a load circuit path and a control circuit path therein, said control circuit path thereof being in a second series circuit combination including a second Zener diode and second impedance means, said second combination being connected across said input conductors;

the load circuit path of said first transistor being connected in a third series circuit combination with third impedance means, said third combination being connected across said input conductors;

and the load circuit path of said second transistor being in a fourth series circuit combination including said first impedance means, said fourth combination being connected across said input conductors.

2. The discriminator of claim 1 wherein:

said first Zener diode is oriented to normally prevent forward biasing current flow in the control circuit path of said first transistor, and said second Zener diode is oriented to normally prevent forward biasing current flow in the control circuit of said second transistor, whereby both of said transistors are maintained normally nonconducting.

3. The discriminator of claim 2 wherein:

the Zener voltage of said first Zener diode is sufficient to prevent current flow in said first transistor until voltage across said input conductors rises to a first predetermined minimum level.

4. The discriminator of claim 3 wherein:

the Zener voltage of said second Zener diode is sufficient to prevent current flow in said second transistor until voltage across said input conductors rises to a second predetermined minimum level above said first level, said levels being established at lower and upper limits of a range of input voltage for which an output is to be produced across said third impedance means.

5. The discriminator of claim 4 wherein:

said first impedance means is in series circuit relationship with the load circuit path of said second transistor, said first impedance means being of a value sufficient to cause back biasing and shutoff of said first transistor upon conduction of said second transistor.